3,168,175
ELECTROMAGNETIC CLUTCHES, PARTICULARLY OF THE AUTOMATIC ADJUSTMENT TYPE
Hermann Straub, Martin-Wieland-Strasse 17, Friedrichshafen, Germany, and Anselm Blum, Gunzenhaus, Gemeinde Kehlen, Germany
Filed Jan. 13, 1961, Ser. No. 82,651
7 Claims. (Cl. 192—84)

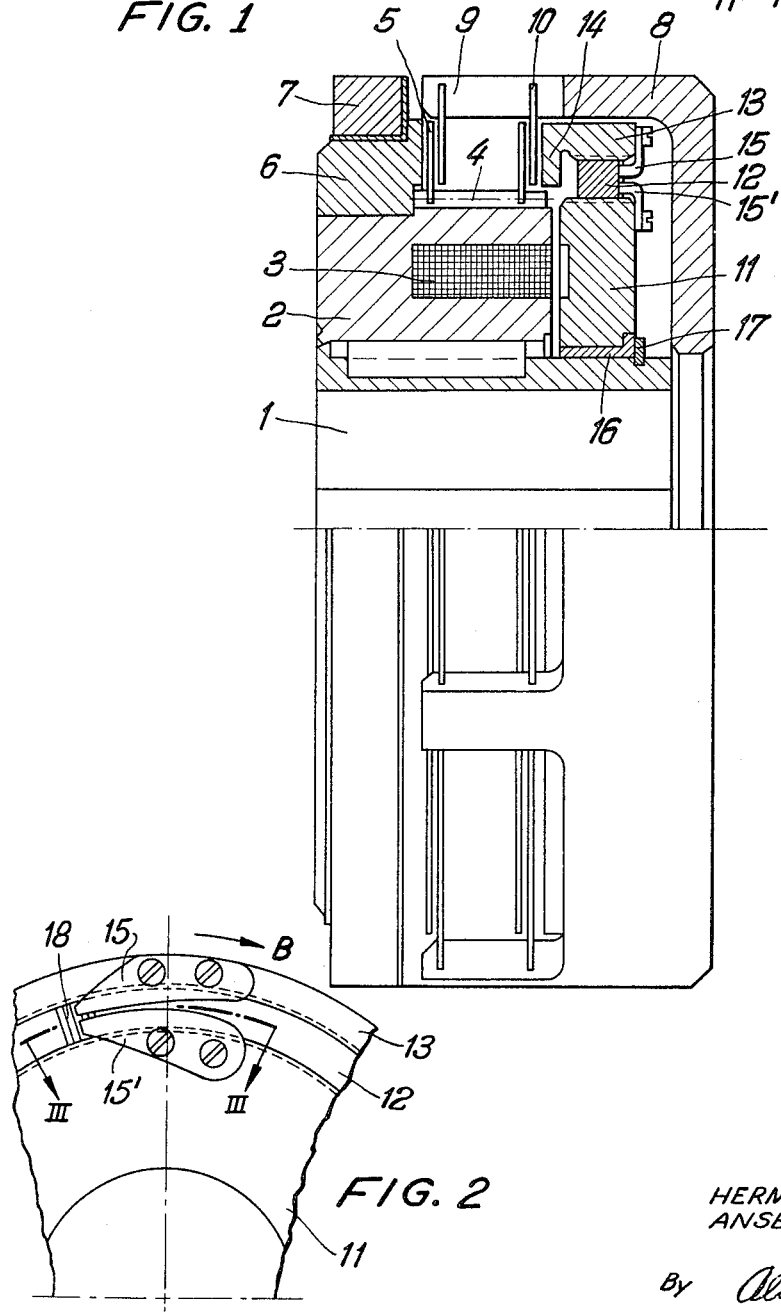

This invention relates to electromagnetic clutches and more particularly to the type of clutch which automatically adjusts the armature air gap and clutch disk compressing ring responsive to friction disk thickness variation.

In prior art constructions of automatically adjustable electromagnetic clutches, certain drawbacks have been found in construction and function in that magnetizable or ferrous elements have been used disposed within the flux region which resulted in sluggish adjustment operation. Another drawback is the length of flux path required which causes magnetic loss and, of course, loss of armature pull strength. A further drawback is the large size that prior art automatic clutches requires in order to comprise the several elements necessary to the clutch function and the adjustment function.

It is an object of the present invention to provide improvements in automatic adjusting clutches of the electromagnetic type so as to overcome the several drawbacks enumerated above.

It is another object of the invention to provide a clutch construction which inherently may be used for either wet or dry clutches, or clutches using either steel or non-metallic disks.

Briefly, our invention comprises the provision of a solenoid magnet body having frictional clutch rings concentrically disposed therearound so as to be completely out of the flux field between the magnet body and the armature. Further, the construction contemplates an automatic adjusting feature wherein the operative components are likewise isolated from the flux field.

Further details of construction and novel features will be apparent from the detailed description to follow taken in conjunction with the appended drawing in which:

FIG. 1 is a longitudinal elevation partially in cross-section of a clutch constructed in accordance with the invention.

FIG. 2 is a fragmentary detail in a radial plane of certain of the automatic adjusting elements; and FIG. 3 is a section through 3—3 of FIG. 2.

Referring now to the drawing, the general construction of the clutch comprises a power driven shaft 1 on which is mounted a magnet body 2 enclosing the solenoid 3. A reaction ring 6 is integrally secured around the magnet body and carries a collector ring 7. The magnet body has splines 4 on which are slidably carried the set for frictional rings 5 for co-action with the frictional rings 10 slidably splined to the splines 9 integral with the clutch housing 8, which serves as a disc carrier and as a housing for the ferrous disc armature 11. The armature is slidable on and rotative relative to shaft 1. The armature 11 carries a ring 12 secured to its periphery by a left-hand thread and on the ring 12 is carried a disc compressor ring 13 which is secured to the ring 12 by right-hand threading. The elements comprising the armature and rings 12 and 13 are carried on a bronze bearing 16 readily slidable on shaft 1 and retained on the shaft by the locking ring 17. Referring to FIGS. 2 and 3, the ring 12 is provided with detent ratchet notches 18 which co-act with flexible pawls 15 and 15' on rings 13 and 11 respectively. The arrangement comprising the elements 11, 13, 15, 15' and 18 comprise the automatic adjusting feature of the clutch, the principles of operation of which are now well known, for example, as shown in the patent to Ryba et al., No. 2,946,419. A brief description of the operation for effecting automatic adjustment is as follows: If the clutch disc rings wear and become thinner, the ring 13 will advance forwardly by virtue of the threaded engagement between ring 12 and armature 11. Thus, as viewed in FIG. 2, if the shaft 1 is rotating in the direction of arrow B and the discs have worn down, armature 11 will engage magnet body 2 and will rotate therewith. Accordingly, if the friction disc sets 5 and 10 are not tightly compressed for full power transmission the housing 8 will lag shaft 1. Accordingly, ring 13 will be rotated by virtue of its flange 14 engaging the outer disc of the disc set 10. Such relative rotation of ring 13, acting through pawl 15, will cause rotation of ring 12 which, as a result of being mounted on a left-hand thread on armature 11, will move forwardly, that is, to the left as viewed on FIG. 1, carrying ring 13 with it, to effect full compression of the compressor flange 14 of that ring against the friction discs. On the other hand, should the clutch be rotating in the opposite direction, automatic adjustment is still effected, this time through pawl 15' and the right hand thread existing between rings 12 and 13.

From the above description it will be understood that energization of solenoid 3 will attract armature 11, whereby the frictional ring sets 5 and 10 will engage for the purpose of driving the housing 8 in a well known manner.

The particular novel feature of the invention resides in the mounting of the frictional ring set concentrically and outside of the magnet body so as to be isolated from the flux existing between the magnet body and the armature, which flux is indicated by the dashed line; and a further feature of the invention resides in making the ring 12 of a nonmagnetic material, for example, bronze, as well as making the bearing collar 16 of a non-magnetic material such as bronze. The use of non-magnetic material for these elements prevents scatter or dispersion of the flux field and helps to maintain the flux field within the region where it can exert the greatest attracting force. At the same time, the use of bronze for the bearing collar 16, which is slidable on shaft 1, effects an anti-friction coaction so that movement of the armature is smooth and rapid.

Accordingly, the construction contemplating the use of a non-magnetic material for the intermediate ring 12 as part of the physical armature, but not entering into the flux field thereof, enables clutches to be built which are smaller than previously known structures wherein the flux was dispersed substantially through the entire armature. In other words, in the present invention the flux is substantially confined to the inner regions of the armature, namely, the disc 11. Further, the removal of the frictional ring sets 5 and 10 from the flux field enables use of dry rings, that is, non-metallic rings or ferrous rings. Thus, in the case of ferrous rings the field flux will not pass therethrough and thus sticking of the clutch due to the field being in the rings, as in prior art construction, is avoided. The positioning of the rings, as clearly shown in FIG. 1, avoids the field flux in the present invention.

The preference for bronze for the ring 12 is particularly advantageous in the case of dry friction ring operation where wear is more likely to occur and, accordingly, automatic adjustment more heavily relied upon. Thus bronze, being an anti-friction material, will facilitate the automatic adjusting function of the device.

A further advantage of the construction resides in the provision of the flange 14 as part of the ring 13, integrally therewith, thus avoiding additional fabrication. The construction which contemplates the mounting of the reaction ring 6 integrally and directly on the magnet body 2 is a further economy in production and eliminates the need for special processes ordinarily used for keying one set of discs to the magnet body in prior art constructions.

From the above description it will be apparent that the novel construction of the clutch effects a production economy, a compactness of size, and a quick-acting clutch, by virtue of the confinement of the flux field to the magnet body and to an inner area of the composite armature whereby any residual magnetism within the parts, which would tend to produce sluggish operation, is eliminated. As a matter of fact, it has been found that even with dry disc sets, that is, non-ferrous, frictional rings, the improved action of the clutch is realized by virtue of such confinement of the magnetic field.

Having thus described our invention we are aware that various changes may be made without departing from the spirit thereof and, accordingly, we do not seek to be limited to the precise illustration herein given except as set forth in the appended claims.

We claim:

1. An electromagnetic clutch comprising a magnet body having a solenoid therein, sets of frictional ring clutch discs surrounding said magnet body, one such set being slidably splined to said magnet body, a clutch housing, another of such sets being slidably splined to said clutch housing, and armature means within said clutch housing, said armature means being movable toward said magnet body upon energization thereof, said armature comprising a ferrous disc, said disc being generally of the diameter of said magnet body, wear compensation means comprising a non-magnetic ring threaded to said ferrous disc on the periphery thereof and rotative with respect thereto and a disc compression ring threaded on the periphery of said non-magnetic ring and rotative with respect thereto, and said wear compensation means including pawl locking means co-acting with said non-magnetic ring to effect automatic locking of said compression ring with respect to said ferrous disc to ensure compensation for wear of said friction rings.

2. In a clutch as set forth in claim 1, said non-magnetic ring being made of bronze.

3. In a clutch as set forth in claim 1, said compression ring comprising a radial flange disposed to engage said friction rings for effecting compression thereof.

4. In a clutch as set forth in claim 1, said pawl locking means comprising a pair of resiliently biased pawls, one of said pawls being secured to and carried by said ferrous disc and the other of said pawls being secured to and carried by said disc compression ring, said non-magnetic ring being provided with a plurality of ratchet notches on a radial face thereof and coacting with said pawls to hold said non-magnetic ring in adjusted position.

5. An electromagnetic clutch comprising a magnet body having a solenoid therein, sets of frictional ring clutch discs surrounding said magnet body, one such set being slidably splined to said magnet body, a clutch housing, another of such sets being slidably splined to said clutch housing, and armature means within said clutch housing, said armature means being movable toward said magnet body upon energization thereof, said armature comprising a ferrous disc, said disc being generally of the diameter of said magnet body, wear compensation means comprising a ring threaded to said ferrous disc on the periphery thereof and rotative with respect thereto and a disc compression ring threaded on the periphery of said first-mentioned ring and rotative with respect thereto, and said wear compensation means including pawl locking means coacting with said first-mentioned ring to effect automatic locking of said compression ring with respect to said ferrous disc to ensure compensation for wear of said friction rings.

6. In a clutch as set forth in claim 4, said pawl locking means being resilient elements secured to the outer radial faces of said ferrous disc and said compression ring.

7. An electromagnetic clutch comprising a magnet body having a solenoid therein, sets of frictional ring clutch discs surrounding said magnet body, one such set being slidably splined to said magnet body, a clutch housing, another of such sets being slidably splined to said clutch housing, and armature means within said clutch housing, said armature means being movable toward said magnet body upon energization thereof, including a shaft, said magnet body being fixed to said shaft, a bronze collar bearing on said shaft, said armature being fixed to said bronze collar bearing for reciprocal movement therewith on said shaft, said armature comprising a ferrous disc, said disc being generally of the diameter of said magnet body, a non-magnetic ring threaded to said ferrous disc on the periphery thereof and rotative with respect thereto and a disc compression ring threaded to said non-magnetic ring and rotative with respect thereto, including pawl locking means coacting with said non-magnetic ring to effect automatic adjusting movement of said compression ring to compensate for wear of said friction rings.

References Cited in the file of this patent

UNITED STATES PATENTS

| | | |
|---|---|---|
| 875,757 | Watson | Jan. 7, 1908 |
| 2,692,035 | Rabinow | Oct. 19, 1954 |
| 2,848,085 | Mannaioni | Apr. 19, 1958 |
| 2,876,879 | Maurice et al. | Mar. 10, 1959 |
| 2,893,528 | Ryba | July 7, 1959 |
| 2,936,053 | Reucker | May 10, 1960 |
| 2,945,573 | Wiedmann | July 19, 1960 |
| 2,946,419 | Ryba | July 26, 1960 |
| 2,989,161 | Diebold | June 20, 1961 |